United States Patent
Huang et al.

(10) Patent No.: US 11,624,731 B2
(45) Date of Patent: Apr. 11, 2023

(54) METHOD FOR PREDICTING REMAINING LIFE OF NUMERICAL CONTROL MACHINE TOOL

(71) Applicant: CHONGQING UNIVERSITY OF POSTS AND TELECOMMUNICATIONS, Chongqing (CN)

(72) Inventors: Qingqing Huang, Chongqing (CN); Zhen Kang, Chongqing (CN); Yan Zhang, Chongqing (CN); Shuaiyong Li, Chongqing (CN); Jiajun Zhou, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 17/614,340

(22) PCT Filed: May 15, 2020

(86) PCT No.: PCT/CN2020/090676
§ 371 (c)(1),
(2) Date: Nov. 25, 2021

(87) PCT Pub. No.: WO2021/004154
PCT Pub. Date: Jan. 14, 2021

(65) Prior Publication Data
US 2022/0146462 A1    May 12, 2022

(30) Foreign Application Priority Data
Jul. 5, 2019   (CN) .......................... 201910607592.6

(51) Int. Cl.
*G01N 29/14* (2006.01)
*G05B 19/4065* (2006.01)
(Continued)

(52) U.S. Cl.
CPC .......... *G01N 29/449* (2013.01); *G01M 13/00* (2013.01); *G01N 29/14* (2013.01);
(Continued)

(58) Field of Classification Search
None
See application file for complete search history.

(56) References Cited

U.S. PATENT DOCUMENTS

| | | | |
|---|---|---|---|
| 2009/0240366 A1* | 9/2009 | Kaushal | G06N 20/00 700/110 |
| 2016/0161939 A1* | 6/2016 | Susnjara | G05B 19/4065 700/169 |
| 2019/0152011 A1 | 5/2019 | Kummari et al. | |

FOREIGN PATENT DOCUMENTS

| | | |
|---|---|---|
| CN | 101382556 A | 3/2009 |
| CN | 102176217 A | 9/2011 |

(Continued)

OTHER PUBLICATIONS

International Search Report for PCT/CN2020/090676 dated Jul. 29, 2020, ISA/CN.

*Primary Examiner* — Matthew G Marini
(74) *Attorney, Agent, or Firm* — Yue (Robert) Xu; Apex Attorneys at Law, LLP

(57) ABSTRACT

A method for predicting a remaining life of a tool of a computer numerical control machine is provided. In the method, indirect measurement indicators of the tool are selected based on monitoring and analyzing a current state of the tool, a prediction model for the remaining life of the tool is established based on data de-noising, feature extraction and a multi-kernel W-LSSVM algorithm. Thereby, a
(Continued)

method for predicting a remaining life of a tool of a computer numerical control machine is provided.

5 Claims, 3 Drawing Sheets

(51) Int. Cl.
    *G01N 29/44*     (2006.01)
    *G01M 13/00*     (2019.01)

(52) U.S. Cl.
    CPC ............... *G05B 19/4065* (2013.01); *G05B 2219/34288* (2013.01); *G05B 2219/37252* (2013.01); *G05B 2219/45145* (2013.01)

(56) References Cited

FOREIGN PATENT DOCUMENTS

| | | | | |
|---|---|---|---|---|
| CN | 102542167 A | 7/2012 | | |
| CN | 103593578 A | 2/2014 | | |
| CN | 104002195 A | 8/2014 | | |
| CN | 105572572 A | 5/2016 | | |
| CN | 107505850 A | 12/2017 | | |
| CN | 108427841 A | 8/2018 | | |
| CN | 108536938 A | 9/2018 | | |
| CN | 109901476 A | 6/2019 | | |
| CN | 110303380 A | * 10/2019 | ......... | B23Q 17/0995 |
| CN | 110303380 A | 10/2019 | | |
| EP | 2169573 A2 | 3/2010 | | |

* cited by examiner

| | PCA_T2__mean | PCA_T2__mean_diff | PCA_T2__delta | PCA_T2__delta_diff |
|---|---|---|---|---|
| 0 | 0.009228 | 0.000558 | 0.084815 | 0.000574 |
| 1 | 0.011791 | 0.000475 | 0.087175 | 0.000393 |
| 2 | 0.014030 | 0.000424 | 0.088889 | 0.000301 |
| 3 | 0.016055 | 0.000388 | 0.090242 | 0.000244 |
| 4 | 0.017925 | 0.000361 | 0.091362 | 0.000206 |
| 5 | 0.019676 | 0.000340 | 0.092320 | 0.000179 |
| 6 | 0.021329 | 0.000322 | 0.093158 | 0.000158 |
| 7 | 0.022903 | 0.000308 | 0.093904 | 0.000141 |
| 8 | 0.024409 | 0.000295 | 0.094576 | 0.000128 |
| 9 | 0.025856 | 0.000284 | 0.095188 | 0.000117 |
| 10 | 0.027252 | 0.000275 | 0.095750 | 0.000108 |

Figure 2

METHOD FOR PREDICTING REMAINING LIFE OF NUMERICAL CONTROL MACHINE TOOL

The present application is a national phase application of PCT international patent application PCT/CN2020/090676, filed on May 15, 2020, which claims the priority to Chinese Patent Application No. 201910607592.6, titled "METHOD FOR PREDICTING REMAINING LIFE OF NUMERICAL CONTROL MACHINE TOOL", filed on Jul. 5, 2019 with the Chinese Patent Office, all of which are incorporated herein by reference in its entirety.

FIELD

The present disclosure relates to the field of life prediction of tools of numerical control machines, and in particular to a method for predicting a remaining life of a tool of a computer numerical control machine.

BACKGROUND

Tool is an important component in industrial manufactures. Life and worn degree of a tool affect production quality and production efficiency of workpieces, and affect state of a lathe. If the remaining life of the tool can be accurately predicted, the cost of industrial manufactures is to be effectively reduced. The method for determining wear of a tool includes a direct method and an indirect method. For the direct method, it is required to measure actual wear in different ways, such as optical measurement, radioactivity analysis and resistance measurement. However, it is difficult to directly measure wear of a tool between or during machine operations. For the indirect method, a state of a tool is detected based on a relationship between a tool condition and a measurable signal (such as a force, an acoustic emission, a vibration, and a current). The indirect method is extensively studied. For example, based on a force, a vibration and an acoustic emission (AE) signal, a remaining life of a cutting tool is predicted by Sun and other people using an operation reliability evaluation and a back propagation neural network (BPNN).

In performing indirect measurement, signal processing is an important process in detecting the state of the tool. In recent years, since more time-frequency information can be extracted in different frequency bands based on the wavelet transform and the wavelet transform has excellent performance in denoising signals, wavelet transform has advantages in signal processing. PCA is a statistical analysis method in which multi-dimensional features are mapped to several comprehensive features. With the PCA, main features of original data are extracted to establish a statistical model. A distributed PCA method (DPCA) is proposed by Ge and other people. With the distributed PCA method, an original feature space is divided into multiple sub-feature spaces based on principal elements in different directions, a PCA model is established for each of the sub-feature spaces, and then an integrated strategy is determined for fault detection and diagnosis. Based on the PCA method, an online inspection system for dynamically monitoring a life of a tool of a model is established by Gao and other people to perform optimal selection on features. Based on the PCA method, a normal state model is established by Baydar by using a multivariate statistical method to detect a state of a gearbox. A support vector machine is realized based on a structural risk minimization theory and a VC dimension theory, and the support vector machine has unique advantages in some nonlinear and small sample problems. A least support square vector machine is a variant of the SVM. With the least support square vector machine, a quadratic programming problem in the SVM is transformed to a linear problem, thereby reducing complexity of a solution process. However, with the LSSVM, sparsity is poor, and estimation of a support value is optimal only in a case of an error variable having a Gaussian distribution. In addition, theoretical basis for selecting a kernel function of the LSSVM is insufficient, how to construct a kernel function having a good adaptability is a problem required to be solved. For the problem, a feasible idea is to construct a multi-kernel least square support vector machine.

SUMMARY

In view of this, according to the present disclosure, a general prediction model for a milling tool of key equipment is provided, indirect measurement indicators of the tool are selected based on monitoring and analyzing a current state of the tool, a prediction model for the remaining life of the tool is established based on data de-noising, feature extraction and a multi-kernel W-LSSVM algorithm, and a method for predicting a remaining life of a tool of a computer numerical control machine is provided.

To achieve the above objectives, following technical solutions are provided according to the present disclosure.

A method for predicting a remaining life of a tool of a computer numerical control machine is provided. In the method, a prediction model for the remaining life of the tool is established based on state monitoring, data de-noising, feature extraction and a multi-kernel weighted least squares support vector machine, and a prediction object for the problem is determined as a milling tool which is a core production element of the computer numerical control (CNC) machine. The method includes the following steps:

step S1: collecting a PLC controller signal and an external sensor signal and monitoring an operation condition and sensor data in a processing process to online monitor wear of the tool and predict the remaining life of the tool, where the sensor data includes vibration signals in three directions of x-axis, y-axis and z-axis and a current signal;

step S2: receiving original signal data and performing pre-processing on the original signal data;

step S3: extracting temporal features of the pre-processed signal obtained in step S2;

step S4: obtaining a data matrix by using a $T^2$ feature map of a principal component analysis PCA based on the temporal features extracted in step S3;

step S5: obtaining a median and a variation of an eigenvector in the data matrix obtained in step S4 in a time period, a first-order difference of the median, and a first-order difference of the variation; and step S6: inputting the matrix eigenvector obtained in step S5 to the multi-kernel weighted least squares support vector machine to obtain a value of the remaining life.

Further, threshold denoising processing is performed on the vibration signals and the current signal collected by a sensor by using a wavelet analysis algorithm in step S2, and then the temporal features are extracted.

Further, the extracting temporal features in step S3 is performed based on a statistical value $T^2$ of the principal component analysis PCA and includes the following steps:

step S31: subtracting an average value, including subtracting, for each of the features, an average value corresponding to the feature;

step S32: calculating a covariance matrix;

step S33: calculating eigenvalues and eigenvectors of the covariance matrix by using a singular value decomposition algorithm;

step S34: sorting the eigenvalues in a descending order, selecting k largest eigenvalues from the eigenvalues, and forming an eigenvector matrix based on k eigenvectors as column vectors, where the k eigenvectors correspond to the k largest eigenvalues;

step S35: converting the data in a new space constructed based on the k eigenvectors; and step S36: calculating a Hotelling T2 statistical value, where the T2 statistical value is expressed as the following equation:

$$T_i^2 = x_i \lambda^{-1} x_i^T$$

where, $x_i$ represents an i-th row of the matrix after the SVD decomposition algorithm, and $\lambda$ represents a diagonal matrix formed by the k largest eigenvalues.

Further, a state identification model in step S6 is implemented based on the multi-kernel weighted least squares support vector machine, and a single-kernel least squares support vector machine performs the following steps:

step S61: optimizing an LSSVM model to obtain a Lagrange multiplier sequence and an error $e_i$;

step S62: performing Gaussian distribution on the error sequence, including multiplying each of errors $e_i$ in the error sequence by a weight $v_i$, where the $v_i$ is expressed as the following equation:

$$v_i = \begin{cases} 1 & \text{if } |e_k/\hat{s}| \le c_1 \\ \dfrac{c_2 - |e_k/\hat{s}|}{c_2 - c_1} & \text{if } c_1 \le |e_k/\hat{s}| \le c_2 \\ 10^{-4} & \text{otherwise} \end{cases}$$

where, $$\hat{s} = \frac{IQR}{2 \times 0.6745},$$

IQR represents an arrangement of the errors $e_i$ in the error sequence in ascending order, a difference $c_1$ between a value of a third quartile and a value of a fourth quartile is equal to 2.5, and a difference $c_2$ between a value of a first quartile and the value of the fourth quartile is equal to 3;

step S63: solving a W-LSSVM model, and constructing functional minimization equations as follows:

$$\min J = \frac{1}{2}\|w^*\|^2 + \frac{\gamma}{2}\sum_{i=1}^{m} v_i e_i^{*2}$$

$$\text{s.t. } y_i = W^* \cdot \varphi(x_i) + b^* + e_i^*$$

where e represents an error variable, and $\gamma$ represents a regularization parameter;

obtaining a Lagrange function as follows:

$$L(w^*, b^*, e^*, \alpha^*) = \frac{1}{2}\|w^*\|^2 + \frac{\gamma}{2}\sum_{i=1}^{m} v_i e_i^{*2} - \sum_{i=1}^{m}[w^*\varphi(x_i) + b^* + e^* - y_i]$$

obtaining the following equations based on a Karush-Kuhn-Tucker condition:

$$\begin{bmatrix} 0 & I^T \\ I & \Omega \cdot \Omega^T + V_\gamma \end{bmatrix} \begin{bmatrix} b^* \\ \alpha^* \end{bmatrix} = \begin{bmatrix} 0 \\ y \end{bmatrix}$$

where $I = [1, 1, \ldots, 1]^T$, $$V_\gamma = \text{diag}\left\{\frac{1}{\gamma v_1}, \frac{1}{\gamma v_2}, \ldots, \frac{1}{\gamma v_m}\right\},$$

$\Omega = [\varphi(x_1), \varphi(x_2), \ldots, \varphi(x_m)]^T$, and $\alpha = [\alpha_1, \alpha_2, \ldots, \alpha_m]^T$;

step S64: performing sparse processing on the model by deleting sample points with small Lagrange multipliers, and outputting a regression model of a single-kernel W-LSSVM regression model as follows:

$$y = W^* \cdot \varphi(x) + b^* = \sum_{i=1}^{m} \alpha_i^* k(x_i, x) + b^*$$

Further, a multi-kernel function is constructed as:

$$K = \lambda_1 K_L + \lambda_2 K_R + \lambda_3 K_P$$

where $\lambda$ represents a weight for each of kernels, $K_L$ represents a linear kernel, $K_R$ represents a RBF kernel, and $K_P$ represents a polynomial kernel.

According to the present disclosure, following benefit effects can be achieved. With the present disclosure, based on indirect measurement signal data, effective features of the data are extracted, and high-precision prediction is performed with small samples.

Other advantages, objectives and features of the present disclosure are described in the following description to a certain extent. To a certain extent, investigation and research based on the following description are apparent for those skilled in the art, or those skilled in the art may learn from the practice of the present disclosure. The objects and other advantages of the present disclosure can be realized and obtained from the following description.

BRIEF DESCRIPTION OF THE DRAWINGS

Hereinafter, the present disclosure is described in detail with reference to drawings to further explain objects, technical solutions, and advantages of the present disclosure. In the drawings:

FIG. 2 shows a schematic diagram of inputted eigenvectors according to an embodiment of the present disclosure.

DETAILED DESCRIPTION OF EMBODIMENTS

Figure 1:
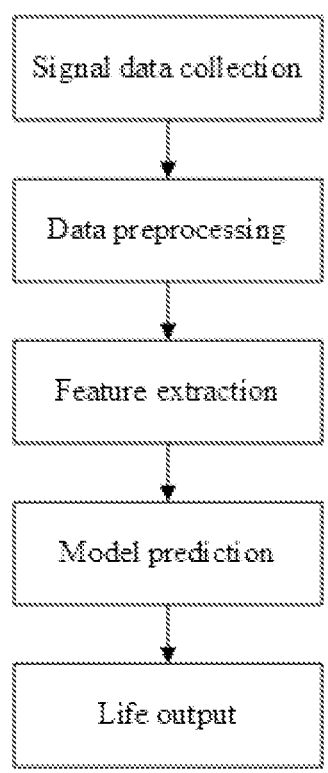
FIG. 1 shows a flow chart of a method for predicting a remaining life of a tool of a CNC machine according to the present disclosure.

The embodiments of the present disclosure are illustrated with specific examples. Those skilled in the art can easily understand other advantages and effects of the present disclosure from the content disclosed in this specification. The present disclosure may be implemented or applied in other different embodiments. Various details in this specification may be modified or changed according to different viewpoints and applications without departing from the spirit of the present disclosure. It should be noted that the drawings in the following embodiments are only used to illustrate the basic concept of the present disclosure. In the case of no conflict, the following embodiments and the features in the embodiments can be combined if no conflict is caused.

The drawings are only used for exemplary description, and are only schematic diagrams rather than physical diagrams, and should not be understood as a limitation of the present disclosure. In order to better illustrate the embodiments of the present disclosure, some components in the drawings may be omitted, enlarged or reduced, and do not represent the size of an actual product. It should be understood by those skilled in the art that some well-known structures and descriptions of the structures may be omitted in the drawings.

The same or similar reference numerals in the drawings of the embodiments of the present disclosure indicate the same or similar components. It should be understood that in the description of the present disclosure, orientations or position relationships, indicated by terms "upper", "lower", "left", "right", "front", "rear", and the like, are orientations or positional relationships shown in the drawings. These terms are used for the convenience of describing the present disclosure and simplifying the description, rather than indicating or implying that devices or elements indicated by the terms must have a specific orientation, or be constructed and operated in a specific orientation. Therefore, the terms describing the position relationship in the drawings are only used for exemplary description, and should not be understood as a limitation of the present disclosure. Those skilled in the art may understand the meanings of the terms in a certain condition.

FIG. 1 shows a method for predicting a remaining life of a tool of a computer numerical control machine. Based on a CPS framework, a controller (PLC) signal and an external sensor signal are collected, and an operation condition and sensor data in a processing process are collected. The sensor data includes a current signal. The sensor data includes vibration signals in three directions of x-axis, y-axis and z-axis and the current signal. Denoising processing is performed on the vibration signals and the current signal collected by a sensor by using a wavelet analysis algorithm. Then, temporal features are extracted. An eigenvectors is extracted from the extracted temporal features by using PCA (principal component analysis). The process of extracting features by using a $T^2$ statistical value of the PCA based on a covariance matrix decomposed by using SVD includes the following steps (1) to (6).

In step (1), an average value is subtracted. That is, for each of the features, an average value corresponding to the feature is subtracted.

In step (2), a covariance matrix is calculated.

In step (3), eigenvalues and eigenvectors of the covariance matrix are calculated by using SVD.

In step (4), the eigenvalues are sorted in a descending order, k largest eigenvalues are selected from the eigenvalues, and an eigenvector matrix is formed based on k eigenvectors as column vectors, where the k eigenvectors correspond to the k largest eigenvalues.

In step (5), the data are converted in a new space constructed based on the k eigenvectors.

In step (6), a Hotelling T2 statistical value is calculated. A $T^2$ eigenvector of the PCA is obtained. Then, feature processing is performed on the extracted $T^2$ eigenvector to obtain a median and a variation of the $T^2$ eigenvector in a time period, a first-order difference of the median, and a first-order difference of the variation. These four eigenvectors are inputted to a multi-kernel W-LSSVM model to obtain a value of the remaining life of the tool. The multi-kernel W-LSSVM model is established by performing the following steps (1) to (5).

In step (1), an LSSVM model is optimized to obtain a Lagrange multiplier sequence and an error $e_i$.

In step (2), Gaussian distribution is performed on the error sequence, including multiplying each of errors $e_i$ in the error sequence by a weight $v_i$, where $v_i$ is expressed as the following equation:

$$v_i = \begin{cases} 1 & \text{if } |e_k/\hat{s}| \leq c_1 \\ \dfrac{c_2 - |e_k/\hat{s}|}{c_2 - c_1} & \text{if } c_1 \leq |e_k/\hat{s}| \leq c_2 \\ 10^{-4} & \text{otherwise} \end{cases}$$

where $$\hat{s} = \frac{IQR}{2 \times 0.6745},$$

IQR represents an arrangement of the errors $e_i$ in the error sequence in ascending order, a difference $c_1$ between a value of a third quartile and a value of a fourth quartile is equal to 2.5, and a difference $c_2$ between a value of a first quartile and the value of the fourth quartile is equal to 3.

In step (3), a W-LSSVM model is solved, and a functional minimization equation is constructed as follows:

$$\min J = \frac{1}{2}\|w^*\|^2 + \frac{\gamma}{2}\sum_{i=1}^{m} v_i e_i^{*2}$$

$$\text{s.t. } y_i = W^* \cdot \varphi(x_i) + b^* + e_i^*$$

where e represents an error variable, and $\gamma$ represents a regularization parameter. Thus, a Lagrange function is obtained as follows:

$$L(w^*, b^*, e^*, \alpha^*) = \frac{1}{2}\|w^*\|^2 + \frac{\gamma}{2}\sum_{i=1}^{m} v_i e_i^{*2} - \sum_{i=1}^{m}[w^*\varphi(x_i) + b^* + e^* - y_i]$$

Based on a Karush-Kuhn-Tucker condition, the following equations are obtained:

$$\begin{bmatrix} 0 & I^T \\ I & \Omega \cdot \Omega^T + V_\gamma \end{bmatrix} \begin{bmatrix} b^* \\ \alpha^* \end{bmatrix} = \begin{bmatrix} 0 \\ y \end{bmatrix}$$

where $I = [1, 1, \ldots, 1]^T$, $$V_\gamma = \text{diag}\left\{\frac{1}{\gamma v_1}, \frac{1}{\gamma v_2}, \ldots, \frac{1}{\gamma v_m}\right\},$$

$\Omega = [\varphi(x_1), \varphi(x_2), \ldots, \varphi(x_m)]^T$, and $\alpha = [\alpha_1, \alpha_2, \ldots, \alpha_m]^T$.

In step (4), sparse processing is performed on the model by deleting sample points with small Lagrange multipliers, and a regression model of a single-kernel W-LSSVM regression model is outputted as follows:

$$y = W^* \cdot \varphi(x) + b^* = \sum_{i=1}^{m} \alpha_i^* k(x_i, x) + b^*$$

In step (5), a multi-kernel function is constructed as:

$$K = \lambda_1 K_L + \lambda_2 K_R + \lambda_3 K_P$$

where $\lambda$ represents a weight for each of kernels, $K_L$ represents a linear kernel, $K_R$ represents a RBF kernel, and $K_P$ represents a polynomial kernel.

Parameters of the multi-kernel W-LSSVM model are selected based on a grid search algorithm. The parameter $\gamma$ ranges from 0.1 to 100, and the parameter $\sigma^2$ ranges from 0.01 to 1 000. An excessively large polynomial kernel degree d may cause the value of the kernel function to tend to zero or infinity. In the present disclosure, an optimal value of d is determined in set {1, 2, ... , 10}. An optimization range is set from 0.01 to 1000. Weights of kernel functions range from 0 to 1.

Figure 3:
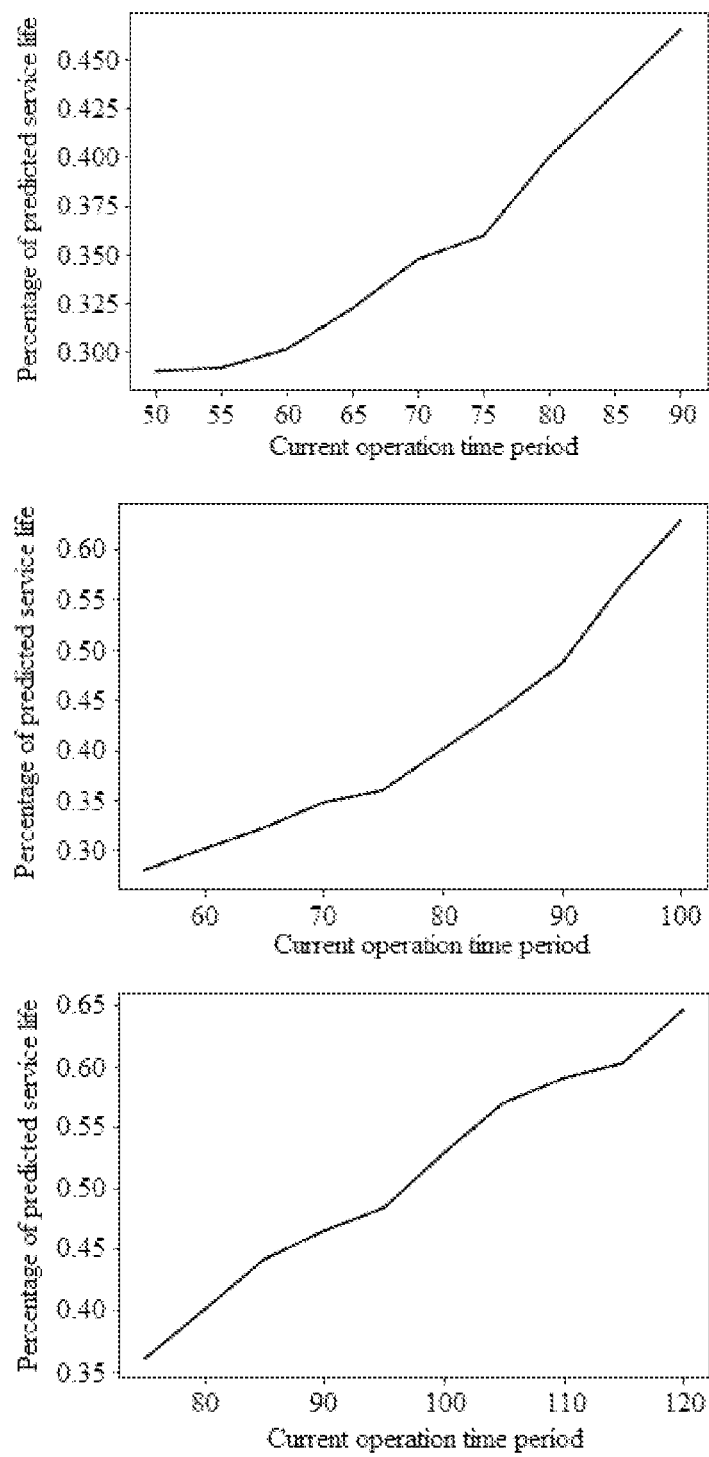
FIG. 3 shows curve graphs of predicted remaining lives according to an embodiment of the present disclosure.

To verify the feasibility and accuracy of the method according to the present disclosure, test experiments are performed, and the multi-kernel W-LSSVM model is compared with other machine learning models. In actual machining processing with the CNC machine, data is collected in a time period from a new tool being used for normal machining processing until the end of the life of the tool. Regarding the data sampling frequency, the sampling frequency of the PLC signal is 33 Hz, and the sampling frequency of the vibration sensor is 25600 Hz. Three groups of data are selected for prediction, and curve graphs of the prediction results are shown in FIG. 3. The multi-kernel W-LSSVM model is compared with an xgboost model and a tree regression model. The comparison standard is an absolute value of a difference between a fitted service life and an actual service life. The comparison results are shown in the following table:

| Experiment type | Error type | Test Sample 1 | Test Sample 2 | Test Sample 3 |
| --- | --- | --- | --- | --- |
| xgboost | absolute error | 2.023 | 3.021 | 12.23 |
| Tree regression | absolute error | 1.252 | 2.523 | 9.563 |
| Multi-kernel W-LSSVM | absolute error | 0.422 | 1.444 | 5.235 |

Based on the test results, it is shows that the remaining life of the tool can be predicted correctly and accurately by using the multi-kernel W-LSSVM model, thereby solving the problem of low accuracy mentioned above.

Finally, it should be noted that the embodiments described above are only provided for describing the technical solutions of the present disclosure rather than limiting the technical solutions. Although the present disclosure is described in detail with reference to the preferred embodiments described above, those skilled in the art should understand that modifications or substitutions may be made to the technical solutions of the present disclosure without departing from the spirit and scope of the present disclosure. The modification or substitutions should fall within the scope of the claims of the present disclosure.

The invention claimed is:

1. A method for managing a tool of a computer numerical control machine, wherein a prediction model for a remaining life of the tool is established based on state monitoring, data de-noising, feature extraction and a multi-kernel weighted least squares support vector machine algorithm, and a prediction object for the remaining life of the tool is determined as a milling tool which is a core production element of the CNC machine, and the method comprises the following steps:

step S1: collecting a signal from a PLC controller of the computer numerical control machine and a signal from an external sensor, and monitoring an operation condition and sensor data of the computer numerical control machine in a processing process to online monitor wear of the tool and predict the remaining life of the tool, wherein the sensor data comprises vibration signals in three directions of x-axis, y-axis and z-axis and a current signal;

step S2: receiving, by a processor, original signal data, and performing pre-processing, by the processor, on the original signal data;

step S3: extracting, by the processor, temporal features of the pre-processed signal obtained in step S2;

step S4: obtaining, by the processor, a data matrix by using a $T^2$ feature map of a principal component analysis PCA based on the temporal features extracted in step S3;

step S5: obtaining, by the processor, a median and a variation of an eigenvector in the data matrix obtained in step S4 in a time period, a first-order difference of the median, and a first-order difference of the variation;

step S6: inputting, by the processor, the matrix eigenvector obtained in step S5 to the multi-kernel weighted least squares support vector machine to output a remaining life value of the tool of the computer numerical control machine; and step S7: replacing the tool of the computer numerical control machine in a case that the outputted remaining life value of the tool is less than a predetermined life threshold.

2. The method for predicting a remaining life of a tool of a computer numerical control machine according to claim 1, wherein threshold denoising processing is performed on the vibration signals and the current signal collected by a sensor by using a wavelet analysis algorithm in step S2, and then the temporal features are extracted.

3. The method for predicting a remaining life of a tool of a computer numerical control machine according to claim 1, wherein the extracting temporal features in step S3 is performed based on a statistical value $T^2$ of the principal component analysis (PCA) and comprises the following steps:

step S31: subtracting an average value, comprising subtracting, for each of the features, an average value corresponding to the feature;

step S32: calculating a covariance matrix;

step S33: calculating eigenvalues and eigenvectors of the covariance matrix by using a singular value decomposition algorithm;

step S34: sorting the eigenvalues in a descending order, selecting k largest eigenvalues from the eigenvalues, and forming an eigenvector matrix based on k eigenvectors as column vectors, wherein the k eigenvectors correspond to the k largest eigenvalues;

step S35: converting the data in a new space constructed based on the k eigenvectors; and step S36: calculating a Hotelling statistical value $T^2$, wherein the statistical value $T^2$ is expressed as the following equation:

$$T_i^2 = x_i \lambda^{-1} x_i^T$$

where, $x_i$ represents an i-th row of the matrix after the SVD decomposition algorithm, and $\lambda$ represents a diagonal matrix formed by the k largest eigenvalues.

4. The method for predicting a remaining life of a tool of a computer numerical control machine according to claim 1, wherein the value of the remaining life is obtained by using the multi-kernel weighted least squares support vector machine in step S6, and a single-kernel least squares support vector machine performs the following steps:

step S61: optimizing an LSSVM model to obtain a Lagrange multiplier sequence and an error $e_i$;

step S62: performing Gaussian distribution on the error sequence, comprising multiplying each of errors $e_i$ in the error sequence by a weight $v_i$ wherein the $v_i$ is expressed as the following equation:

$$v_i = \begin{cases} 1 & \text{if } |e_k/\hat{s}| \leq c_1 \\ \dfrac{c_2 - |e_k/\hat{s}|}{c_2 - c_1} & \text{if } c_1 \leq |e_k/\hat{s}| \leq c_2 \\ 10^{-4} & \text{otherwise} \end{cases}$$

where $$\hat{s} = \dfrac{IQR}{2 \times 0.6745},$$

IQR represents an arrangement of the errors $e_i$ in the error sequence in ascending order, a difference $c_1$ between a value of a third quartile and a value of a fourth quartile is equal to 2.5, and a difference $c_2$ between a value of a first quartile and the value of the fourth quartile is equal to 3;

step S63: solving a W-LSSVM model, and constructing functional minimization equations as follows:

$$\min J = \frac{1}{2}\|w^*\|^2 + \frac{\gamma}{2}\sum_{i=1}^{m} v_i e_i^{*2}$$

$$\text{s.t. } y_i = W^* \cdot \varphi(x_i) + b^* + e_i^*$$

where e represents an error variable, and $\gamma$ represents a regularization parameter;

obtaining a Lagrange function as follows:

$$L(w^*, b^*, e^*, \alpha^*) = \frac{1}{2}\|w^*\|^2 + \frac{\gamma}{2}\sum_{i=1}^{m} v_i e_i^{*2} - \sum_{i=1}^{m}[w^*\varphi(x_i) + b^* + e^* - y_i]$$

obtaining the following equations based on a Karush-Kuhn-Tucker condition:

$$\begin{bmatrix} 0 & I^T \\ I & \Omega \cdot \Omega^T + V_\gamma \end{bmatrix} \begin{bmatrix} b^* \\ \alpha^* \end{bmatrix} = \begin{bmatrix} 0 \\ y \end{bmatrix}$$

where $I = [1, 1, ..., 1]^T$, $V_\gamma = \text{diag}\left\{\dfrac{1}{\gamma v_1}, \dfrac{1}{\gamma v_2}, ..., \dfrac{1}{\gamma v_m}\right\}$, $\Omega = [\varphi(x_1), \varphi(x_2), ..., \varphi(x_m)]^T$, and $\alpha = [\alpha_1, \alpha_2, ..., \alpha_m]^T$;

step S64: performing sparse processing on the model by deleting sample points with small Lagrange multipliers, and outputting a regression model of a single-kernel W-LSSVM regression model as follows:

$$y = W^* \cdot \varphi(x) + b^* = \sum_{i=1}^{m} \alpha_i^* k(x_i, x) + b^*.$$

5. The method for predicting a remaining life of a tool of a computer numerical control machine according to claim 4, wherein a multi-kernel function is constructed as:

$$K = \lambda_1 K_L + \lambda_2 K_R + \lambda_3 K_P$$

where $\lambda$ represents a weight for each of kernels, $K_L$ represents a linear kernel, $K_R$ represents a RBF kernel, and $K_p$ represents a polynomial kernel.

* * * * *